Sept. 5, 1939.  W. D. MORTON ET AL  2,171,837
AUTOMATIC CLUTCH MECHANISM
Filed April 28, 1933  2 Sheets-Sheet 1

Inventors
Wade D. Morton
William E. Haupt

Strauch + Hoffman
Attorneys

Sept. 5, 1939.          W. D. MORTON ET AL          2,171,837
AUTOMATIC CLUTCH MECHANISM
Filed April 28, 1933          2 Sheets-Sheet 2

Inventors
Wade D. Morton
William E. Haupt
Strauch & Hoffman
Attorneys

Patented Sept. 5, 1939

2,171,837

UNITED STATES PATENT OFFICE 2,171,837

AUTOMATIC CLUTCH MECHANISM

Wade D. Morton, Philadelphia, Pa., and William E. Haupt, Brooklawn, N. J., assignors to Automatic Drive & Transmission Company, Gloucester City, N. J., a corporation of New Jersey Application April 28, 1933, Serial No. 668,430

6 Claims. (Cl. 192—105)

The present invention relates to automatic drive and clutch mechanisms, adapted to transmit power from a driving to a driven shaft, and although they possess operating characteristics and structural features that particularly adapt them for motor vehicle and similar drives, they may be successfully employed in a wide variety of power transmitting drives.

More particularly, the present invention relates to automatic clutch mechanisms of the type wherein a driving member is mounted for axial movement of and is driven by a supporting member and is actuated by speed responsive mechanism to frictionally grip or clamp a driven member between it and the supporting member.

Automatic clutch mechanisms of this general character have been heretofore proposed, but they are so designed that the cost of producing them would be excessive; they are so extremely bulky as to render them inapplicable to motor vehicle and like drives; they fail to transmit reasonable amounts of power in comparison with their size, and their operating characteristics are such as to render them wholly unsuitable for incorporation in motor vehicle or like drives. These major factors have so militated against these prior mechanisms that they have not been adopted in practice, and they accordingly have no successful commercial history.

A serious defect inherent in prior automatic clutch mechanisms of this general character resides in the fact that the driving member, in response to actuation of the speed responsive mechanism, solidly grips the driven member between it and its supporting member, with the result that pressure builds up so rapidly between the engaging faces of the driving and driven members that a torque of rapidly increasing and widely fluctuating magnitude is accordingly transmitted to the driven member, and the latter and the drive mechanism and load to which it is connected are accelerated in an uneven manner, with the result that shocks are transmitted to the drive mechanism and load, that are so severe in some instances that parts thereof are actually distorted or broken under the stresses set up in them. The entire engaging operation of these prior mechanisms occurs over a small range of speed of the driving member, and establishes a positive frictional coupling between the driving and driven members at a fairly low speed, with the result that if an internal combustion engine, a high speed electric motor, or a steam turbine is employed as the prime mover, the latter is accordingly compelled to accelerate the load when operating at a low torque delivery speed, and is often stalled by such engaging operation. This type of operation moveover causes clutch engagement to occur with a harsh grabbing or chattering action, and this feature of itself renders such prior mechanisms wholly unfit for drives where a smooth power transmission is desired.

Another highly objectionable feature attending the operation of prior automatic clutch mechanisms of the character mentioned resides in the fact that the driving member is forced into engagement with the driven member in a misalignment, with the result that clutch engagement often occurs with a chattering and grabbing action, the driven member is subjected to a twisting action with each revolution of the clutch members and rapid wear of the facing material is produced. This objectionable feature also often causes localized areas of the engaging members to be heated to high temperatures with the result that the driving and driven members are warped or distorted and smooth clutch action is further impaired and the useful life of the mechanism materially shortened.

Clutch mechanisms of this general character have also been heretofore proposed wherein manually operable mechanism is provided for moving the driving member away from the driven member against the action of the speed-responsive mechanism for the purpose of disconnecting the driving and driven shafts. These mechanisms have proven to be highly impractical for the reason that even at moderately high speeds, the forces exerted by the speed-responsive mechanism are so great, that it is extremely difficult, if not altogether impossible to manually withdraw the driving member from the driven member for declutching purposes.

Prior automatic clutch mechanisms of this character that have been heretofore proposed possess a further objectionable operating feature that has militated against their adoption in many power drives. This feature resides in the fact that when the prime mover, or other mechanism that delivers power to the driving member, is operating at, or below, idling speed, it is impossible to establish a driving connection between the driving and driven shafts with such prior clutch mechanisms. It is clearly desirable that the mechanism be capable of effecting a driving connection between the driving and driven shafts regardless of whether the latter are rotating or stationary. For instance, in motor vehicle drives, it is frequently necessary to place the transmission in gear and tow or coast the vehicle in order to turn the engine over for cranking purposes when either the starting crank is lost or the engine is cold and stiff or the battery low. It is also desirable, when parking on a steep grade, to use the motor as an auxiliary brake by placing the transmission in low or reverse gear. It is also sometimes desirable to place the transmission in low or reverse gear when the engine is dead, and propel the vehicle away from a dangerous location by means of the starting motor.

The present invention provides automatic clutch mechanisms that are free from all of the defects and disadvantages inherent with the mechanisms of this character that have been heretofore proposed, and the present application is a continuation-in-part of our co-pending application, Serial Number 606,238, filed April 19, 1932, wherein the subject matter of the present application is disclosed.

It is accordingly a primary object of the present invention to devise novel clutch mechanisms that will automatically transmit torque of slowly increasing magnitude from a driving to a driven member, when one of the members is accelerated, that are extremely flexible and efficient in operation and adapt themselves to a wide variety of power transmitting drives, that are simple and rugged in design and stand up well in use, even under severe operating condition; and yet that may be manufactured by low cost, quantity production methods.

Another important object of the present invention resides in the provision of automatic clutch mechanisms of the type wherein a driving member is forced into engagement with a driven member by speed-responsive mechanism that is responsive to the speed of the driving member; with means for establishing and maintaining a slipping drive between the driving and driven members throughout a substantial speed range of the driving member, when the driving and driven members are engaged under the influence of the speed responsive mechanism, for causing a torque of relatively slowly increasing magnitude to be transmitted from the driving to the driven member, whereby a smoothly operating mechanism is produced.

A further major object of our invention is to devise for use in clutch mechanisms of the type wherein a driving member is adapted to frictionally engage a driven member; a novel speed responsive mechanism for forcing the driving member into engagement with the driven member in such manner that pressure is slowly built up between the driving and driven members and a torque of slowly increasing magnitude is transmitted from the driving to the driven member when the driving member is accelerated.

It is another major object of our invention to provide automatic clutch mechanisms wherein a driven member is frictionally gripped between a pair of driving members, one of which is axially movable and is actuated by speed responsive mechanism to produce engagement when the driving members are accelerated; with means for establishing a yielding contact pressure between the engaging faces of the driving and driven members when the latter are engaged under the influence of the speed responsive mechanism, whereby clutch engagement is smooth and the driven member is smoothly accelerated with a slipping drive that exists throughout a substantial speed range.

Another object of our invention is to provide clutch mechanisms of the general character wherein driving and driven members are mounted for engagement and disengagement and are actuated by speed-responsive mechanism; with means for resiliently or yieldingly taking the reaction of the speed responsive mechanism, and for establishing a yielding engagement pressure between the driving and driven members when the latter are engaged under the influence of the speed responsive mechanism.

Another object of my invention is to provide, for use in clutches wherein driving and driven members are mounted for engagement and disengagement; a novel speed responsive mechanism for forcing the driving and driven members into frictional engagement, that is so designed that it applies pressure substantially uniformly about the engaging areas of the driving and driven members, regardless of any slight inaccuracies of the parts due to defective machining operations or inaccuracies of the parts resulting from their manufacture by low cost, quantity production methods.

Another object of our invention is to provide automatic clutch mechanisms of the type wherein speed-responsive mechanism acts upon a driving member and reacts against a reaction member to cause the driving member to engage a driven member; with means for permitting the reaction member to tilt or float in response to actuation of the speed-responsive mechanism, whereby engaging pressure is uniformly applied to the driving member and a smoothly operating mechanism obtained.

It is a still further object of the present invention to provide automatic clutch mechanisms that will bring the driving and driven members together with a pressure that builds up at a certain predetermined rate during one phase of the engaging operation, and at a different predetermined rate or rates during another phase or phases of the engaging operation.

Another object of our invention is to provide an automatic clutch of the plate type with means for establishing and maintaining the plates in parallel relation, and which means may be employed to establish proper idle release clearance, between the plates.

A further object of our invention resides in the provision in automatic clutch mechanisms of the plate type; of means for establishing and maintaining the plates in proper parallel relation, and of means for establishing proper idle clearance of the plates without disturbing the parallel adjusted relation of the latter.

Another object of our invention is to so design automatic clutch mechanisms of the character having a driving plate that is resiliently urged toward the driven plate by spring means, and which is normally maintained in spaced relation to the driven member against the action of the spring means when the driving plate is rotating below a predetermined speed by movement limiting means; that the movement limiting means does not set up flexing or distorting tendencies in the driving plate when it holds the latter in spaced relation to the driven member against the action of the spring means.

It is a further object of the present invention to devise, for use in friction plate clutch mechanisms, a novel speed-responsive mechanism for forcing the plates into frictional engagement, that operates with a minimum of friction and wear, and that is so designed that all of the parts thereof are held tight during all phases of their operation, regardless of whether they are accurately designed, or whether the dimensional changes, that they undergo through wear thereof during operation, occur to an equal extent on all of them.

Another object of the present invention is to devise an automatic clutch mechanism that has an axially movable member which automatically moves in one direction when the clutch mechanism undergoes automatic engaging operation, and which is adapted to be moved in an opposite direction to produce clutch engagement.

It is a further object of our invention to equip clutch mechanisms of the character wherein speed responsive mechanism is employed to urge a driving member into frictional engagement with a driven member when the driving member attains a predetermined speed; with means for readily manually moving the driving member away from the driven member irrespective of the speed attained by the driving member.

It is a further object of our invention to provide automatic clutch mechanisms that are so designed, and the parts are so disposed that the friction plates are substantially thermally isolated from any springs that may be associated with the mechanism, whereby there is no possibility of the heat, generated in the plates, drawing or harmfully modifying the temper of the springs.

Further objects of our invention will become apparent as the specification proceeds in connection with the drawings and from the annexed claims.

In the drawings:

Figure 3 is a view similar to Figure 1, illustrating the clutch mechanism disclosed in that figure as it appears when provided with manual declutching mechanism, also forming part of our invention.

Figure 1:
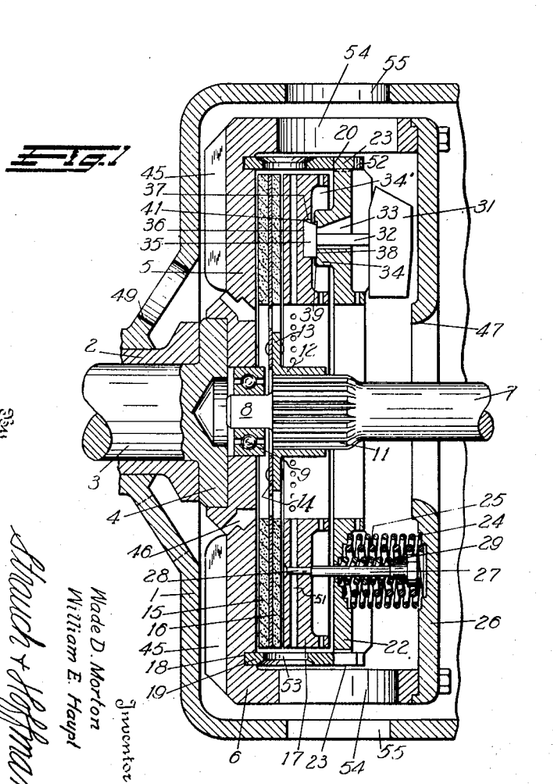
Figure 1 is a longitudinal sectional view of an automatic clutch mechanism forming part of our invention.

Referring to the drawings, wherein like reference characters designate like parts throughout the several views thereof, a clutch housing 1 is suitably connected to the body of a prime mover or other source of rotational energy, and is provided with a bearing 2 in which is journaled an engine shaft 3. Shaft 3 is provided with a flange 4, to which web 5 of a flywheel 6 is suitably secured.

Disposed in axial alignment with shaft 3 is a driven shaft 7 which is reduced at 8 at one end thereof and journaled in a suitable anti-friction bearing assembly 9 secured in the flywheel web, and is adapted to have the other end thereof operatively connected to the load that is to be driven, or a suitable gear changing apparatus for multiplying the torque transmitted to the load. Driven shaft 7 has a splined portion 11 upon which a correspondingly splined hub 12 is slidably mounted. Hub 12 is provided with a flange 13 to which is secured, in any suitable manner, as by welding, riveting or the like, a relatively thin metal disc 14, which constitutes the driven clutch disc or member.

Disc 14, near the periphery thereof, is provided with annular frictional facings 15 and 16, which consist of any suitable material that has good wearing properties, and at the same time has properties capable of producing a slipping drive in our mechanisms, but which are preferably constructed of a material that has proved to be highly practical in automatic clutch mechanisms of the Powerflo type. One form of material which may be used is disclosed in the patent to Charles B. Heinrich, No. 1,979,880 dated Nov. 6, 1934. Frictional facings 15 and 16 may be secured to disc 14 in any suitable manner, as for instance by means of rivets or the like. Facing 15 frictionally cooperates with the face of flywheel 6 and frictional facing 16 cooperates with a clutch plate 17 for effecting a driving connection between driving shaft 3 and driven shaft 7. In this connection it is observed that the web of the flywheel 6 constitutes a clutch plate. Plate 17 is designated as the automatic plate. Automatic plate 17 is caused to move over and frictionally clamp member 14 between it and the flywheel by means that will presently be described.

Extending circumferentially about the clutch plate structure, and seating in a groove 18 formed in the flywheel web, is an apertured cylindrical shell 19, having key slots 20 formed therein. Shell 19 is rigidly secured to the flywheel structure in any suitable manner and constitutes a stop. Cooperating with stop member 19 is a disc-like member 22 which acts as a yielding reaction member for the centrifugally operable means, and is preferably flanged to give it rigidity. Plate 22 is provided with lugs or keys 23 which seat in key slots 20 provided in shell 19, thereby providing a driving connection between the flywheel and plate 22. Plate 22 is urged toward the flywheel web and stop member 19 by means of a series of spring units. The spring units are preferably three in number and each preferably consists of a pair of compression springs 24 and 25 which seat in recesses in a cover plate 26 at one end, and in suitable recesses formed in the reaction member 22 at their other ends. Cover plate 26 is secured to the face of the flywheel flange by means of cap screws or the like, and shims or like members may be disposed between the housing member and the flywheel for the purpose of adjusting the mechanism. When assembling the spring units in the device, springs 25 are merely disposed loosely in their respective sockets, while springs 24, which are lighter than springs 25, are placed under a substantial initial compression for a purpose that will presently appear.

Automatic plate 17 is urged toward reaction member 22 by means of a series of screws 27 having reduced portions 28 inserted in apertures in automatic plate 17, and having the ends thereof headed over. Screws 27 are encircled by compression springs 29 which bear against the heads of screws 27 and seat in recesses formed in the automatic plate.

Plate 17 is actuated into frictional engagement with driven member 14 by means of any suitable speed responsive mechanism, and which in the present instance takes the form of centrifugal weights 31, preferably three in number and provided with lever sections 32. Levers 32 extend through apertures 33 formed in reaction plate 22, and also through bosses 34 formed on the latter. Weights 31 are symmetrically arranged about plate 22, between the spring units. Bosses 34 constitute driving keys, and seat in driving engagement with the walls of key slots 34' formed in automatic plate 17. Automatic plate 17 is therefore driven by plate 22, and the latter is driven by the flywheel, but they are capable of axial movement with respect to the flywheel and with respect to each other. Although we have disclosed a specific manner of keying the automatic and reaction plates, it is to be understood that the latter may be independently keyed directly to the flywheel in any desired manner, and an operative mechanism obtained.

Sections 32 carry heads 35 at their extremities, each of which is provided with a flat face 36 that abuts the bottom face of an elongated rectangular bearing recess 37 formed in automatic plate 17, when the flywheel is driven at a speed corresponding substantially to, or below, the idling speed of the prime mover employed to drive it. Heads 35 are also provided with faces 38 adapted to abut and fulcrum in recesses 39 formed in bosses 34. Heads 35 have their outer sides relieved to provide knife-like edges 41 which are adapted to seat and fulcrum in the dihedral angles defined by the bottom and outer side walls of recesses 37. If desired, plate 17 may be keyed directly to the flywheel, bosses 34 omitted, and faces 38 allowed to cooperate with the face of plate 22.

When shaft 3 and flywheel 6 are operating at or below a speed corresponding substantially to the normal idling speed of the prime mover employed to drive them, the parts assume the position in which they are disposed in Figure 1, with the centrifugally operable weights in their innermost or retracted positions, and with the plates disengaged. The mechanism is then in what is termed its idle release condition, and shafts 3 and 7 are disconnected.

As the speed of the flywheel is increased above idling speed, weights 31 gradually swing or rock outwardly about their edges 41 as pivots in response to centrifugal force. As this occurs, faces 38 of heads 35 abut and fulcrum in recesses 39, and with edges 41 force automatic plate 17 and reaction plate 22 mutually away from each other.

When automatic plate 17, under the influence of centrifugal weights 31, is moved axially sufficiently to take up the idle release clearance between the plates and clamp the driven member between it and the flywheel face, movement of the automatic plate is completed. After completion of movement of the automatic plate, further outward movement of weights 31, in response to further centrifugal force, causes reaction member 22 to move out of contact with member 19 and away from the flywheel on a three-point support, through the reaction of faces 38, provided on weight-heads 35, against the faces of recesses 39 formed on plate 22. The initial stage of movement of plate 22 away from the flywheel is opposed by springs 24 and pressure is built up in the latter. Springs 25 do not oppose movement of plate 22 during this stage of movement of the latter, because they are not under compression at this time. The pressure built up in springs 24, through the weight-heads 35, causes a similar pressure to build up between the facings 15 and 16, and the flywheel face and the face of automatic plate 17, and a torque of comparatively low and slowly increasing magnitude is transmitted from shaft 3 to shaft 7. The low and slowly increasing torque transmission during this operation causes shaft 3 to smoothly pick up shaft 7 without chattering or shock.

When reaction plate 22 has been moved to the right a predetermined distance, in response to acceleration of shaft 3 to a predetermined speed, plate 22 grips springs 25 between it and cover member 26, and at this time the first stage of clutch operation, or pressure build-up, may be said to be completed, and the second stage initiated. Further movement of plate 22 to the right under the influence of weights 31 causes pressure to be built up in springs 25 as well as in springs 24, and a correspondingly greater pressure is built up between the faces of the plates, with the result that a torque of more rapidly increasing magnitude is transmitted from shaft 3 to shaft 7. The parts are preferably so designed, that when the second stage is initiated, the relative speed of shaft 3 with respect to shaft 7 is not great, so that a rapid pressure build-up in the second stage is obtained for the purpose of comparatively rapidly bringing the plates into non-slipping engagement. In this connection, second stage springs 25 may be preloaded, or placed under an initial compression if desired, in order to provide a more rapid pressure build-up in the second stage, and it is to be understood that this is also embraced by the present invention.

Figure 2:
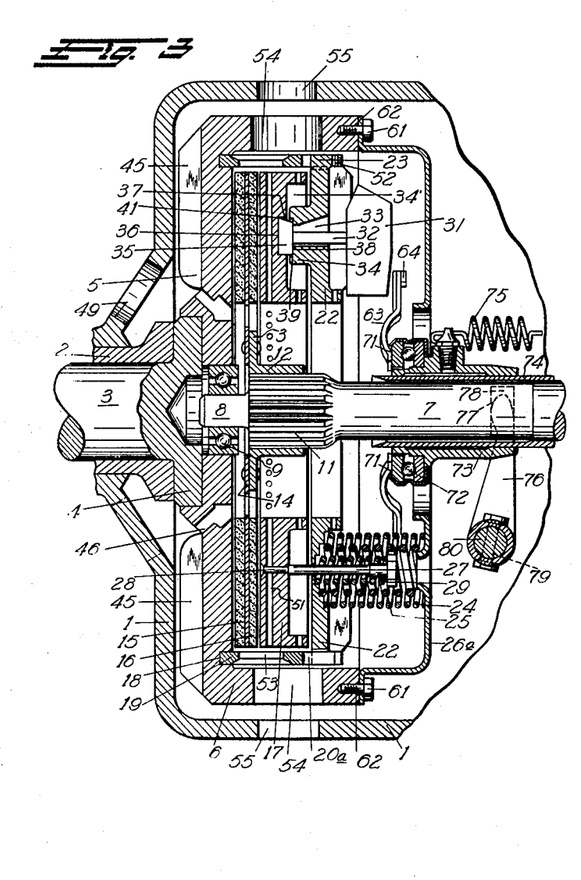
Figure 2 is a fragmental view of the upper part of Figure 1, illustrating one of the centrifugally operable weights in its outermost position, and the plates engaged.

When shaft 3 attains a predetermined speed, the plates are brought into non-slipping engagement by weights 31, thereby establishing a positive friction connection between the driving and driven shafts. When this condition is reached, the parts assume the positions in which they are shown in Figure 2 of the drawings, with the outer bevelled faces of weights 31 in contact with the rear face of reaction member 22. Weights 31 are therefore restrained from further movement in response to centrifugal force, and further acceleration of shaft 3 is therefore ineffective to cause weights 31 to exert further increasing driving forces upon plate 17. While we prefer to employ plate 22 to limit the outward rocking movement of weights 31, it is to be understood that they be designed to stop against cover 26 or the flywheel if desired, without departing from the spirit of our invention.

If desirable in practice, the parts may be so designed that the two pressure stages merge into each other so completely that the transition from one to the other cannot be distinguished, and while we have disclosed a mechanism providing only two pressure stages, it is to be understood that three or more pressure stages may be provided if desired, without departing from the spirit of our invention.

The use of multiple springs to build up the operating pressures in stages permits a relatively slow building up of pressures at the lower speeds when the clutch is picking up the load, and a rapid building up of pressures after the load is moving to secure a non-slipping drive, even with clutch facings containing as high as fifty to sixty per cent or more of graphite in the original mixture from which the clutch facings are formed. Accordingly, while our automatic clutch when provided with a single series of backing springs has been found commercially practical, and we intend this form of our invention to be embraced by the disclosure, our improved clutch gives a materially improved smoothness in slipping drive, and has a greatly increased life.

It will be noted that fulcrum edges 41 of the weight levers are disposed approximately midway between the inner and outer periphery of plate 17, and hence act upon the automatic plate in line contact with, and for a substantial distance across the face thereof, applying substantially uniform pressure opposite the center of the engaging faces. This structural feature minimizes warping and twisting tendencies of the plates under the pressures to which they are subjected during operation. Uniform disposition of the spring units around the reaction plate provides a uniformly distributed spring reaction for the latter.

In view of the resilient nature of the backing means for the reaction member, should certain weights 31 swing further outwardly than the remaining weights, the pressure exerted thereby will nevertheless be uniformly distributed about the periphery of plate 17 for the reason that the reaction plate can tilt or float, and take a slight angular position with respect to automatic plate 17, due to the fact that the sole movement limiting means of the reaction member is constituted by springs 24 and 25, and the keying means for the plates, and the latter is given sufficient play or clearance to permit this tilting action.

Cooling of the clutch elements, and disposition of the particles that are freed from the facings during operation is effected in the following manner. A plurality of radial fins 45 are formed on flywheel 6, and are so disposed as to lie opposite the area of the flywheel that cooperates with facing 15. A plurality of apertures 46 are provided in the flywheel web, so that rotation of the flywheel causes the fins or fan blades 45 to induce a draft of air to flow through a suitable opening (not shown) formed in the clutch housing, through the relatively large opening 47 provided in cover 26, and over the flywheel face. This air current serves to dislodge and carry away any particles that are disposed between facing 15 and the flywheel face when the latter are disengaged, and also efficiently cool these members. A portion of the axially moving air stream enters apertures 46 and flows over the outer face of flywheel 6, thereby cooling the latter. If desired, further air may be supplied by means of apertures 49 formed in housing 1.

The automatic plate is provided with radially extending passages 51 through which air is adapted to flow for cooling the automatic plate. A portion of the axial air stream passes between facing 16 and the face of the automatic plate when the plates are disengaged for the purpose of cooling the parts and for removing freed facing material particles.

The automatic and reaction plates are disposed in spaced relation during all phases of operation and therefore a portion of the axial air stream may flow between them at all times. This operation not only cools the adjacent faces of plates 17 and 22, but prevents the transfer of the heat generated in plate 17, to plate 22. Plate 22 is accordingly retained at a fairly low temperature at all times and there is no possibility of drawing or harmfully modifying the temper of the springs associated with plate 22. An air stream also flows over the rear face of plate 22, and to assist the cooling action apertures 52 are preferably formed in the flanges of the latter.

The heated, dust-laden air currents exhausted from the mechanism, flow through apertures 53, formed in stop member 19, apertures 54 formed in the flywheel rim, and thence to the atmosphere through apertures 55, formed in housing 1.

If desired, exhaust parts 55 may be provided with a suitable valve, for controlling the dissipation of heat from the mechanism, in the manner shown in our co-pending application Serial No. 606,238, filed April 19, 1932.

Figures 2, 5:
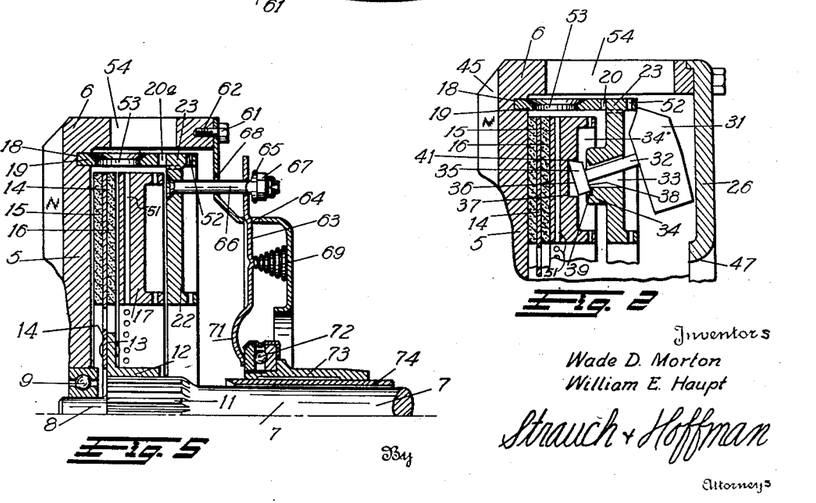
Figure 5 is a fragmental sectional view showing the cooperation of the declutching mechanism with the other clutch parts, and is taken on the line V—V of Figure 4.
Figure 4:
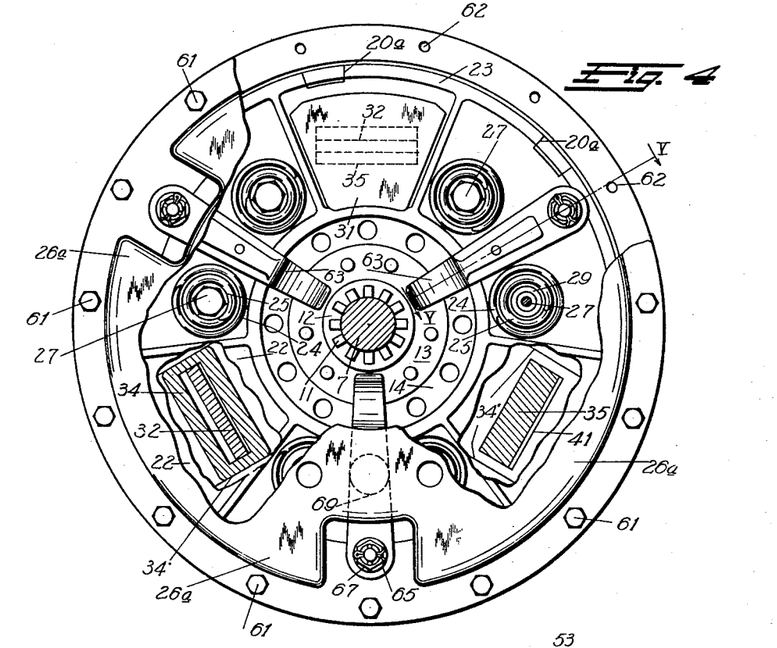
Figure 4 is a view illustrating the mechanism shown in Figure 3 as it appears when viewed from the right-hand side of that figure with certain parts broken away, and certain other parts removed to more clearly illustrate the structure involved.

Referring now to Figures 3, 4 and 5 of the drawings, we have illustrated the mechanism just described provided with a throwout or manual declutching mechanism, and in view of the fact that many of the parts are identical, in structure and function, to corresponding parts shown in Figures 1 and 2 they have been given like reference characters and will not be again described.

With continued reference to these figures, a combined housing and reaction member 26a is secured to the flywheel by a series of cap screws 61, threaded into the flywheel at 62. Housing member 26a is provided with pressed out portions, against which springs 24 and 25 are seated. Springs 24 and 25 cooperate with the members against which they bear in precisely the same manner as those previously described.

The reaction plate is adapted to be withdrawn from the other clutch members against the action of springs 24 and 25 by means of clutch fingers 63, which are fulcrumed in apertures 64 formed in housing 26a. Fingers 63 cooperate with fulcrum members 65 which are adjustably held on studs 66 by means of locknuts 67. Studs 66 extend through apertures 68 in housing 26a, and are rigidly secured to plate 22 in any suitable manner. A plurality of springs 69 are held in place between housing 26a and fingers 63 and serve to hold the fingers in engagement with their fulcrums at all times and prevent vibration thereof. By rotating nuts 67 the relation between studs 66 and fingers 63 may be adjusted, and the angular relation of the plates may be adjustably varied. After the initial adjustment of the parts at the factory, all service adjustments for plate wear may be made externally of the clutch as will be pointed out hereinafter. Nuts 67 may also be manipulated for varying the clearance between the clutch plates in a manner that will presently be described.

Clutch fingers 63 are provided with curved faces 71 which cooperate with a clutch throwout bearing assembly denoted generally at 72, which is mounted on a sleeve member 73. Sleeve member 73 is slidably mounted on a stationary hollow supporting member 74, through which shaft 7 extends. Sleeve member 73 is urged toward re-tracted position by means of a tension spring 75 which is secured to a suitable part of housing 1. This spring is relatively light, since its sole function is to keep the bearing assembly out of contact with fingers 63 at all times except when declutching operations are being effected. Sleeve 73 is adapted to be moved toward clutch fingers 63 against the action of spring 75 by means of lever or fork members 76 which have curved extremities abutting cooperating bosses 77 formed on sleeve 74. Levers 76 cooperate with flat faces 78 to prevent rotation of sleeve 73 about support 74, and are keyed by means of pins 79 or the like to a shaft 80. A conventional clutch pedal (not shown) is rigidly carried by shaft 80, exteriorly of the clutch housing.

Although we have disclosed a specific throwout assembly in connection with our invention, it is to be understood that any suitable throwout mechanism having a face that is substantially normal to the clutch axis for cooperating with the inner ends of levers 63 may be employed if desired, and a thoroughly practical mechanism obtained.

Before proceeding to further structure, it should be observed that the greater length of driven shaft 7 is clear of supporting sleeve 74, the latter being stationarily mounted in the clutch housing or casing. Therefore, substantial eccentric, or angular misalignment of driving shaft 3 and driven shaft 7 can have no effect whatever upon the operation of the throwout bearing assembly and its cooperation with fingers 63. Moreover, since driving shaft 3, in the present instance, is the crank shaft of the engine, and the bearing face of support 74 is carefully machined to lie exactly parallel to driving shaft 3, their permanent alignment is assured and the throwout bearing assembly, providing springs 24 and 25 are properly assembled, causes plate 17 to be disposed in parallel relation to the flywheel face at all times, regardless of whether the clutch is engaged or disengaged. Moreover, levers 63 will be held tight at all times, regardless of manufacturing inaccuracies, or inaccuracies that arise due to wear, by their three-point support on the face of the throwout bearing assembly while the throwout bearing is positively maintained in proper alignment by virtue of the stationary guiding means formed on the clutch housing, providing smooth clutch action with minimum pedal operating pressures at all times in a low cost construction requiring a minimum of manufacturing accuracy.

Clutch pedal shaft 80 is preferably adjustably held by a suitable mechanism in such a position that the throwout bearing assembly will hold the parts in the positions in which they are shown in Figure 3 when driving schaft 3 is stationary or is operating at, or below, a predetermined idling speed of the prime mover utilized therewith. Under these conditions, a clearance exists between the plates and there is accordingly no driving connection between shafts 3 and 7. Any suitable latch mechanism may be associated with shaft 80 or the clutch pedal for holding shaft 80 in this position, but we preferably employ the type of clutch pedal latch mechanism disclosed in our co-pending application, Serial Number 595,284, filed February 25, 1932, and which may be referred to for a full disclosure thereof. The throwout bearing assembly is shown in Figure 3 in what is termed its "automatic position", and is so termed because it is preferably disposed in this position when the clutch mechanism functions, or is being employed as an automatic or speed-responsive clutch.

The clutch pedal may be depressed to move the throwout bearing assembly to the left of the position shown in Figure 3, for manually declutching the mechanism in a manner to be hereinafter pointed out, and the parts of the latch mechanism are so designed to allow this movement of the pedal without interference.

The latch mechanism may be operated to allow the clutch pedal to retract and permit the throwout bearing to move to the right of the position illustrated in Figure 3 into what is termed its manually engaged position. In this form of the invention, recesses 20a are of greater depth than recesses 20, described in connection with Figure 1, and permit lugs 23 to travel therein through quite a range of axial movement. The bottoms of recesses 20a therefore do not function as stops in this modification of the invention.

With the throwout mechanism disposed in automatic position, the speed-responsive, or automatic operation of the mechanism is as follows:

Automatic operation

As driving shaft 3, the flywheel 6 are accelerated, weights 31 gradually swing or rock outwardly about their knife edges 41 as axes in response to centrifugal force. As this occurs, reaction faces 38 of heads 35 fulcrum and slide on the faces of recesses 39, and knife edges 41, by virtue of their engagement and fulcruming action upon the flat bottom surfaces of recesses 37 in automatic plate 17, force automatic plate 17 away from reaction plate 22 against the action of holdback springs 29, and into engagement with facing 16 of disk 14, on a three-point support, thus causing disk 14 to move axially and bring the facing 15 thereof into contact with the flywheel face. After the driven member is thus clamped or gripped between automatic plate 17 and flywheel 6, further rocking movement of weights 31 causes faces 38 of heads 45 to force reaction plate 22 away from the flywheel against the action of springs 24, and the driven shaft is smoothly picked up in a two-stage slipping drive as described in connection with the first form of our invention.

As the prime mover accelerates, centrifugal weights 31 swing outwardly and cause the driven member to be clamped between the automatic plate and the flywheel in the manner just described. Movement of automatic plate 17 away from reaction member 22 is opposed by holdback springs 29 and therefore weights 31 are held under control. Holdback springs 29, therefore, in addition to predetermining the speed of the mechanism at which automatic engaging operation is initiated, exert a steadying influence upon the clutch parts.

When the automatic engaging operation just described is being effected, reaction plate 22, and its associated parts are moved to the right of the positions shown in Figure 3. Movement of reaction plate 22 to the right causes the inner ends of levers 63 to move from their coperating engagement with the face of the bearing assembly, thereby relieving the throwout bearing assembly of pressure. The throwout bearing assembly therefore only operates when the clutch is operating at idling speeds or is manually declutched and therefore receives only a minimum amount of wear and its life is therefore greatly increased.

With the above described mechanism installed in a motor vehicle provided with a conventional three-speed transmission, and the vehicle is on a substantially level surface, the transmission may be placed in high gear, if the engine is operating below the engaging speed of the clutch mechanism, and the engine may be accelerated to produce automatic clutch engagement in the manner previously described. During the engaging operation, a slipping drive exists between shafts 3 and 7 and the vehicle is accelerated smoothly and without shock, and in view of the speed-responsive engaging characteristics of the mechanism, it is impossible to stall the engine through improper actuation of the accelerator. When the engine and vehicle speeds are properly correlated, the clutch plates are brought into full driving engagement, thereby establishing a direct coupling between shafts 3 and 7.

When operating in this manner, and it is desired to decelerate or stop the vehicle, the accelerator is released and the brakes are applied.

When the vehicle has decelerated to a speed corresponding substantially to engine idling speed, through the combined braking action of the engine and the vehicle brake mechanism, weights 31 rock inwardly under the influence of holdback springs 29 and disengagement of the clutch plates is automatically effected. Shafts 3 and 7 are thereby automatically uncoupled and the braking action of the engine is no longer transmitted to shaft 7, but in view of the fact that the disengaging speed of the clutch mechanism is fairly low, the vehicle is decelerated to a relatively low speed under the braking influence of the engine before the mechanism automatically disconnects shafts 3 and 7.

The vehicle may be brought to a complete stop by continued application of the brakes, or, if traffic conditions permit, the accelerator may be depressed and the engine accelerated to produce almost immediate re-engagement of the mechanism and the vehicle again picked up in high gear.

Due to their slipping drive characteristics, the present mechanisms constitute drive mechanisms as well as clutches, and while they do not multiply the torque delivered from shaft 3 to shaft 7, they permit the engine to operate at a higher speed, and consequently, on a higher point on its speed-torque curve, and deliver more power, than if substantially non-slipping conditions existed between shafts 3 and 7, and this feature, in combination with the lubricated facings, and self-cooling characteristics of the present mechanism, renders it entirely feasible to operate vehicles in which they are incorporated in high gear under normal conditions.

As previously explained, the latch mechanism is adjusted to hold the parts in the positions shown in Figure 3 of the drawings when the prime mover is operating at idling speed or is stationary. When the facings have become thin, as the result of particles thereof wearing away during operation, and cause the idle release plate clearance to become too great, the throwout bearing assembly is moved slightly to the right of the position in which it is shown in Figure 1, by adjusting the latch pedal on its shaft, or adjusting the latch mechanism in any suitable manner, in order to dispose automatic plate 17 closer to the flywheel and establish proper plate clearance for idle release conditions.

In our co-pending application, Serial Number 595,184, filed February 25, 1932, we have disclosed adjusting mechanisms that have proved to be highly successful in practice, and we contemplate using these adjusting mechanisms in the present invention.

When facing wear has been compensated for by moving the throwout bearing assembly further to the right several times, levers 63 may be allowed to move to the right to such an extent, under some conditions, that they take undesirable angular positions. This condition is readily remedied, or compensated for, by adjusting nuts 67 an equal amount, and sufficient to bring levers 63 into the proper positions desired. The external adjusting mechanism previously referred to may then be manipulated to establish proper idle release clearance between the plates. The normal plate wear compensating adjustment, however, is made externally of the clutch housing by adjusting the angular position of shaft 80 into proper automatic position, and therefore the adjustment does not in any way affect the adjusted positions of nuts 67, and consequently the angular relation of the plates.

Manual disengaging operation

When the plates have been automatically brought into full driving engagement in the manner previously described, the clutch pedal may be depressed to displace the throwout bearing assembly and the inner ends of levers 63 to the left of the positions in which they are shown in Figures 3 and 5. Movement of levers 63 in this manner causes them to fulcrum about and react against studs 66 and withdraw the reaction plate away from the flywheel. Withdrawal of the reaction plate produces withdrawal or disengagement of automatic plate 17 from the driven member because plates 17 and 22 are held in unitary relation by the holdback assemblies. If the engine speed is maintained above the predetermined engaging speed during the manual declutching operation, weights 31 remain in their outermost positions; therefore, the declutching operation does not involve retracting the weights against the action of centrifugal force, which, at high speeds might be sufficiently high to preclude effecting the manual declutching operation.

In traffic, when it is desired to get the vehicle away quickly, and in starting up steep grades, the clutch pedal may be operated in this manner to disengage the plates for gear shifting purposes as in a vehicle provided with a manually operable clutch. The clutch pedal may also be operated to produce manual engagement of the plates, (if the engine is operated above the automatic engaging speed of the mechanism) in a manner similar to a manual clutch for maneuvering the vehicle into and out of parking positions or for navigating in heavy traffic.

Manual engaging operation

As has been previously pointed out, when shaft 3 is operating substantially at the idling speed of the prime mover, or is stationary, and the clutch pedal is latched to dispose the throwout bearing in the automatic position shown in Figure 3, a clearance exists between the clutch plates, and shafts 3 and 7 are accordingly disconnected. When it is desired to establish a driving connection between shafts 3 and 7 under these conditions, the latch associated with the clutch pedal is actuated to allow the latter to move into its retracted position.

Retraction of the clutch pedal allows the throwout bearing assembly to move to the right under the influence of springs 24, and the latter, acting against the reaction plate bring reaction plate 22 and automatic plate 17 to the left of the positions in which they are shown in Figure 3, with automatic plate 17 in driving engagement with the driven member, thereby coupling shafts 3 and 7. Although the sole driving force under these conditions is exerted by springs 24, the pressure developed between the plates by their action is sufficient to establish a driving connection between shafts 3 and 7 that is wholly adequate to transmit the torque involved when the mechanism is operated in this manner.

With the above described mechanism installed in a motor vehicle, it is frequently desirable to effect this manual engaging operation. For instance, when the motor is cold and the battery is low, it is desirable to place the transmission in gear and push or coast the vehicle to turn the engine over. Also when stopping on a steep grade, positive engagement of the clutch, with the transmission placed in low or reverse gear, provides an emergency brake that cannot be inadvertently released; or if the motor stalls, from lack of fuel or any other cause, the vehicle can pull out of dangerous positions by propelling it in low gear with the starting motor.

We have disclosed driving spring units, consisting of pairs of springs, for causing plate pressure to build up in two stages, and while we prefer to employ this type of organization, it is to be understood that the driving spring units may be designed to consist of three or more springs, so as to cause the plate pressure to build up in three or more stages if desired, or in fact the two springs in each unit may be replaced by a single stronger spring, so as to provide only one pressure stage, without departing from the spirit of the present invention. It is also to be understood that each holdback spring 29 may be replaced by two or more holdback springs to cooperate with the mechanism whether or not the latter is equipped to build up plate pressure in one or more pressure stages, if desired.

We also have described our invention as preferably being associated with a latch mechanism of the type disclosed in our co-pending application Serial Number 595,184, filed February 25, 1932, for holding the throwout mechanism in intermediate or automatic position, but it is to be understood that the vacuum operated mechanism also shown in the above mentioned application, or any other suitable mechanism, may be associated with the throwout mechanism for causing the latter to undergo proper movements when the engaging operation is being effected to augment or supplement the action of automatic weights 31, if desired, and the appended claims are intended to embrace mechanisms of this character. We also contemplate the use of the oil or air pressure operated mechanisms disclosed in the above mentioned co-pending application in connection with the throwout mechanism of the present invention for the purpose of automatically bringing the throwout mechanism in automatic position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a clutch mechanism, a driving member; an automatic plate mounted for rotation with said driving member and for movement axially thereof for clutching and declutching purposes; a driven member disposed between said driving member and said automatic plate and adapted to be frictionally gripped therebetween; a reaction plate mounted for rotation with said driving member and for movement axially thereof; a primary resilient means acting upon said reaction plate for urging said automatic and reaction plates toward said driven member; holding means connected to said reaction plate for normally preventing said primary resilient means from forcing said automatic plate into engagement with said driven member; centrifugally operable means for forcing said automatic plate and said reaction plate away from each other, to thereby cause said automatic plate to engage said driven member, when said driving member reaches a predetermined speed; and a secondary resilient means adapted to be picked up by said reaction plate when the latter moves a further distance away from said driving member in response to the attainment of a higher predetermined speed by said driving member.

2. The clutch mechanism described in claim 1, wherein said primary and secondary resilient means comprises a plurality of compression springs adapted to act against said reaction plate and react against an element carried by said driving member.

3. In an automatic clutch, in sub-combination, a clutch plate assembly, comprising an automatic plate and a reaction plate having speed responsive means for forcing them away from each other; a tension member extending through an aperture in said reaction plate and secured to said automatic plate; a compression spring encircling said tension member and adapted to urge said automatic plate and said reaction plate toward each other; a primary pressure spring encircling said compression spring and said tension member and bearing against said reaction plate, and a secondary pressure spring encircling said primary pressure spring and adapted to react against said reaction plate.

4. In a clutch mechanism, in sub-combination, an automatic and reaction plate assembly, comprising an automatic plate and a reaction plate mounted for synchronous rotation and for relative axial movement; means for insuring synchronous rotation of said plates, comprising a plurality of bosses provided on said reaction plate and extending into parallel-walled recesses provided in said automatic plate, said bosses being adapted to drivingly engage said parallel walls of said recesses; and a centrifugally operable weight lever extending through each of said bosses and having a laterally extending portion adapted to act upon said automatic plate and react against said boss, for forcing said plates away from each other when said levers rock outwardly in response to centrifugal force.

5. In an automatic clutch, a driving member mounted for rotation and having a frictional surface disposed substantially normal to its axis and having a part providing a spring seating surface axially spaced from said frictional surface; an automatic plate disposed between said surfaces and mounted for axial movement with respect to said driving member; a driven disc disposed between said automatic plate and said frictional surface, a reaction plate disposed between said automatic plate and said spring seating surface and also mounted for axial movement with respect to said driving member, a plurality of compression springs disposed between said reaction plate and said spring seating surface of said driving member and operable to force said reaction plate toward said driven member; holding means for normally limiting movement of said reaction plate toward said frictional surface under the influence of said compression springs, and speed responsive means for forcing said automatic and reaction plates away from each other when said driving member attains a predetermined speed, to thereby cause said automatic plate to frictionally grip said driven member between it and said frictional surface and cause said reaction member to move toward said spring seating surface and compress and build up pressure in said compression springs, said speed responsive means comprising a plurality of rockable weighted levers having arms extending through axially directed openings provided in said reaction member, each of said arms terminating in a laterally disposed head extending substantially radially with respect to said driving member, each of said heads cooperating with a straight surface provided on said reaction plate and a straight surface provided on said automatic plate and operable to exert clutch engaging forces thereagainst when said arms rock outwardly in response to centrifugal force, and means for compelling said heads to rock about definite axes on said surfaces of said automatic plate, said reaction plate having an axially directed flange provided thereon and extending away from said frictional surface of said driving member, said flange being operable to contact portions of said weighted levers and arrest the latter when they attain a predetermined outward position under the influence of centrifugal force, to thereby limit the clutch pressure built up thereby.

6. The clutch described in claim 5 wherein said driving member comprises a flywheel mounted on the end of a driving shaft and said frictional surface is constituted by the side of the flywheel remote from said driving shaft, said flywheel having a cover secured thereto in spaced relationship to said side of said flywheel to define a chamber for housing said automatic and reaction plates and said driven disc, said cover having a surface facing the said side of said flywheel and constituting the spring seating surface of said driving member.

WADE D. MORTON.
WILLIAM E. HAUPT.